United States Patent [19]

Tanaka

[11] Patent Number: 5,252,940
[45] Date of Patent: Oct. 12, 1993

[54] SOFT MAGNETIC MATERIAL
[75] Inventor: Minoru Tanaka, Nagano, Japan
[73] Assignee: Seiko Epson Corporation, Tokyo, Japan
[21] Appl. No.: 673,610
[22] Filed: Mar. 22, 1991

Related U.S. Application Data

[63] Continuation of Ser. No. 400,596, Aug. 30, 1989.

[30] Foreign Application Priority Data

Aug. 30, 1989 [JP] Japan .................. 1-215640

[51] Int. Cl.$^5$ .............................................. H01F 1/14
[52] U.S. Cl. .................................... 335/302; 335/296; 148/311; 148/313; 420/127
[58] Field of Search ............... 335/220, 279, 281, 296, 335/302; 148/311, 313; 420/127

[56] References Cited

U.S. PATENT DOCUMENTS

| | | | |
|---|---|---|---|
| 3,024,141 | 3/1962 | Burket | 148/311 |
| 3,624,568 | 11/1971 | Olsen | 335/153 |
| 3,891,475 | 6/1975 | Tomita et al. | 148/311 |
| 4,247,601 | 1/1981 | Weigand | 400/121 |
| 4,626,115 | 12/1986 | Norigoe | 400/124 |
| 4,820,065 | 4/1989 | Koyama | 400/124 |

FOREIGN PATENT DOCUMENTS

| | | |
|---|---|---|
| 281542 | 2/1986 | Japan . |
| 253348 | 11/1986 | Japan . |
| 22404 | 1/1987 | Japan . |
| 2022403 | 1/1987 | Japan ........................ 148/311 |
| 40344 | 2/1987 | Japan . |
| 149356 | 6/1988 | Japan . |

OTHER PUBLICATIONS

Inui, et al., "Production of Permendur in Coil Strip", Hitachi Metals Technical Review, vol. 3, pp. 20–24, 1987.

Josso, MM, "Les Alliages Magnetiques Doux Au Service Des Animants", La Metallurgie, vol. 104, No. 11, pp. 437–446, 448, Nov. 1972.

E. Josso, "Iron-Cobalt-Vanadium Alloys", IEEE Transactions on Magnetics, vol. MAG-10, No. 2, Jun. 1974, pp. 161–165.

*Primary Examiner*—Leo P. Picard
*Assistant Examiner*—Raymond Barrera
*Attorney, Agent, or Firm*—Blum Kaplan

[57] ABSTRACT

A magnetic material and an actuator having magnetic circuit elements incorporating the magnetic material formed of equal amounts of iron and cobalt and between about 2.1 to 5% by weight vanadium. The actuator is well suited for inclusion in an impact printer for driving the impact members of the impact printer in response to printing signals. The composition of the magnetic material of the actuator provides high energy efficiency under greatly fluctuating direct current conditions by reducing eddy currents.

12 Claims, 4 Drawing Sheets

SOFT MAGNETIC MATERIAL

This is a continuation of application Ser. No. 07/400,596, filed Aug. 30, 1989.

BACKGROUND OF THE INVENTION

The invention relates generally to a magnetic actuator and more particularly to a magnetically driven actuator including a soft magnetic material such as an Fe-Co-V alloy particularly well suited for driving printing wires in an impact printer.

Fe-Co-V alloys are commonly employed in actuators and other devices when magnetic materials having high saturation magnetic flux density are required. Actuators commonly include soft magnetic material having a chemical composition of about 48-52% by weight cobalt, less than about 2.0% by weight vanadium, incidental impurities and the remainder iron. As the percentage of vanadium exceeds 2.0%, the DC magnetic properties of the magnetic material deteriorate. A common form of this alloy is 2V. PERMENDUR. This Fe-Co-V soft magnetic alloy exhibits favorable magnetic properties and favorable energy efficiency, compared to magnetic pure iron or magnetic silicon steel.

Conventional Fe-Co-V alloys employing less than 2% by weight vanadium have certain undesirable inherent properties. For example, when the magnetic material undergoes a large magnetic loss the energy efficiency of the magnetic material deteriorates significantly. In addition, conventional Fe-Co-V alloys exhibit certain unsuitable magnetic properties when subjected to rapid current fluctuations.

Accordingly, it is desirable to provide improved magnetic material which can be included in an actuator for an impact printer or other device which overcomes the shortcomings of actuators formed of prior art magnetic material.

SUMMARY OF THE INVENTION

Generally speaking, in accordance with the invention magnetic material and an actuator incorporating the magnetic material are provided in which the magnetic material includes an Fe-Co-V alloy formed of approximately equal amounts of iron and cobalt and the remainder about 2.1 to 5% by weight vanadium. An impact printer including the actuator includes impact members such a printing wires driven by the actuator The actuator includes the magnetic material and operates the impact members of the print head when it is energized by electric current.

Accordingly, it is an object of the invention to provide improved magnetic material and an improved actuator including the improved magnetic material.

Another object of the invention is to provide an improved Fe-Co-V alloy for an actuator.

A further object of the invention is to provide an improved impact print head.

Still a another object of the invention is to provide an actuator having low magnetic loss and high energy efficiency when subjected to rapidly fluctuating current.

Still a further object of the invention is to provide an actuator having excellent DC properties.

Yet another object of the invention is to provide an actuator formed of magnetic material which reduces eddy current generated by the flow of current through a coil in a magnetic circuit to provide an actuator with high generation of magnetic flux having low magnetic loss and high energy efficiency.

Still other objects and advantages of the invention will in part be obvious and will in part be apparent from the specification and drawings.

The invention accordingly comprises the several steps and the relation of one or more of such steps with respect to each or the others, and the apparatus embodying features of construction combinations of elements and arrangements of parts which are adapted to effect such steps, and a composition of matter possessing the characteristics, properties, and the relation of constituents all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Magnetic material formed in accordance with the invention is an Fe-Co-V alloy including approximately equal amounts of iron and cobalt and between about 2.1 to 5% vanadium. When this magnetic material is included in an actuator, the electric resistance of this magnetic material will be larger than commercially available 2V. PERMENDUR. When generating magnetic flux in the actuator by flowing current through a coil of a magnetic circuit including magnetic material prepared in accordance with the invention, the amount of eddy current which hinders generation of magnetic flux is reduced This leads to a decrease in magnetic loss, an increase in energy efficiency and improved magnetic properties when the actuator is operated by rapidly fluctuating electric current.

Figure 1:
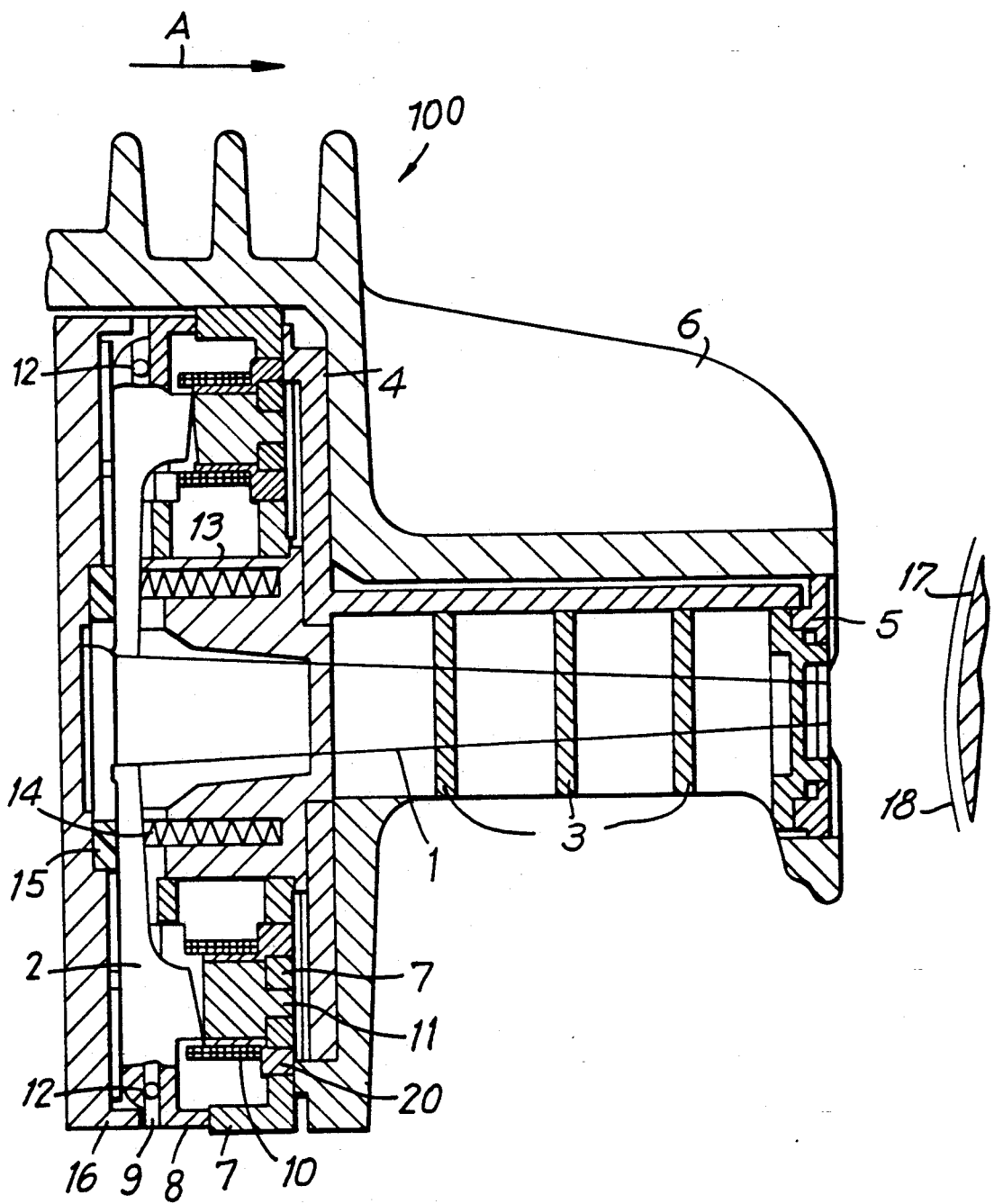
FIG. 1 is a cross-sectional view of an impact print head formed in accordance with the invention.

Fe-Co-V magnetic material formed in accordance with the invention is well suited for inclusion in an actuator for an impact print head such as a print head 100 shown in FIG. 1 and other devices requiring magnetic actuators including soft magnetic material. Impact print head 100 includes a plurality of print wires 1 driven by a driving lever 2. One end of driving lever 2 is pivotally mounted about a fulcrum shaft 12. The distal end or driving lever 2 is secured to print wire 1. Print wire 1 is the impact printing member for print head 100 and impacts a printing ribbon (not shown) to transfer printing material to a sheet of recording paper 18 carried on a platen 17.

Print head 100 also includes a rear housing cover 16 fixed to a nose portion 6 and a wire nose 4 engaged with an inner frame 13 and an end wire guide 5, fixed to nose portion 6. A plurality of wire guides 3 are located within nose portion 6 and printing wire 1 is disposed through wire guides 3 and in end wire guide 5.

Dots are printed on paper 18 when driving lever 2 is magnetically attracted in accordance with printing signals to travel in the direction of an arrow A to drive printing wire 1 through wire guides 3 and 5 to impact platen 17. Driving lever 2 is magnetically attracted by a bottomed cylindrical core block 7, formed of a soft magnetic material. The position of core block 7 is defined by wire nose 4. Core block 7 cooperates with a bottomed cylindrical yoke 8 and a disk-like side yoke 9 which are operatively coupled to lever 2 to attract driving lever 2 towards core block 7 when dots are to be printed.

Core block 7 is formed with a ring-like protruded interior core 11 mounted on an interior portion of core block 7. A coil bobbin 20 is mounted on inner core 11 and at least one coil 10 is wound around the outer surface of coil bobbin 20, around protruded inner core 11 to form a portion of the magnetic path. Coil bobbin 20 is provided with a plurality of projections which fit into corresponding holes in core block 7. Inner core 11 is held in a hole provided in core block 7 by caulking or other common adhesives Cylindrical yoke 8, side yoke 9 and inner core 11 can also be formed of the soft magnetic material and together with core block 7 form a magnetic circuit and are referred to collectively as the magnetic circuit elements.

A soft magnetic material was formed in accordance with the invention and included 48.8% cobalt, 2.3% vanadium and the remainder iron. Inevitable impurities were also present. Throughout the application, all compositions will given on a weight percent basis based on the entire composition of the soft magnetic material. An impact print head similar to print head 100 was formed and included soft magnetic material having this composition in core block 7, cylindrical yoke 8, side yoke 9 and inner core 11 and the printer exhibited acceptable properties. The decrease in magnetic loss achieved by reducing the eddy current generated when electric current flows through coil 10 is also achieved as long as at least one of the magnetic circuit elements noted above are formed of the soft magnetic material prepared in accordance with the invention.

Print head 100 is operated by selectively applying electric signals corresponding to printing signals to coil 10. This creates magnetic attractive force between driving lever 2 and inner core 11 from magnetic flux entering both cylindrical yoke 8 and disk-like side yoke 9 from core 11. Driving lever 2 is attracted in the direction of arrow A to pivot about fulcrum shaft 12 in the direction of arrow A to drive print wire 1 towards platen 17.

When coil 10 is energized, the electrical resistance or the soft magnetic material of the magnetic circuit elements is relatively high due to the relatively high percentage of vanadium compared to conventional compositions. This leads to relatively restrained and decreased occurrences of eddy current. Accordingly, the energy input to coil 10 can be reduced and the energy efficiency of print head 100 can be increased by using a soft magnetic material prepared in accordance with the invention.

After print wire 1 forms a dot on paper 18, coil 10 is de-energized and a return spring 14 forces driving lever 2 in a direction opposite to arrow A against a damper 15 to position driving lever 2 and print wire 1 in a standby condition. As print head 100 operates, coil 10 and the magnetic circuit elements are subjected to rapidly fluctuating current.

Figure 3:
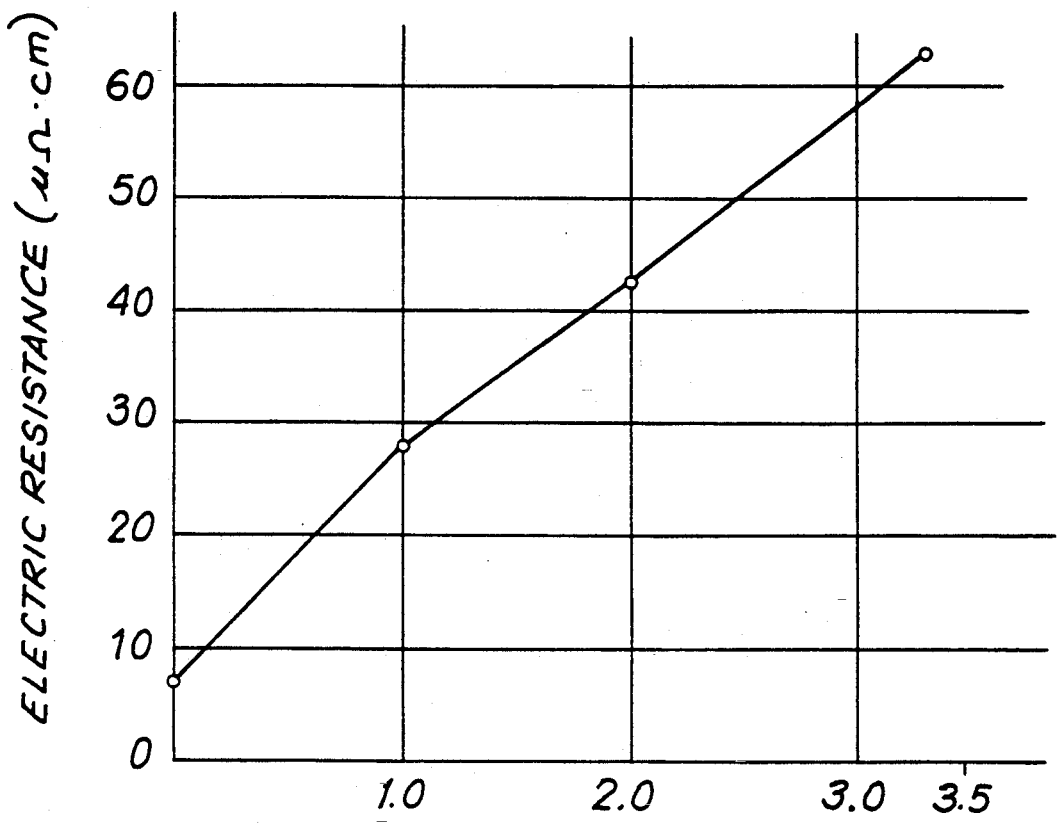
FIG. 3 is a graph illustrating the change in electric resistance with a change in vanadium percentage included in the magnetic material in accordance with the invention.
Figure 4:
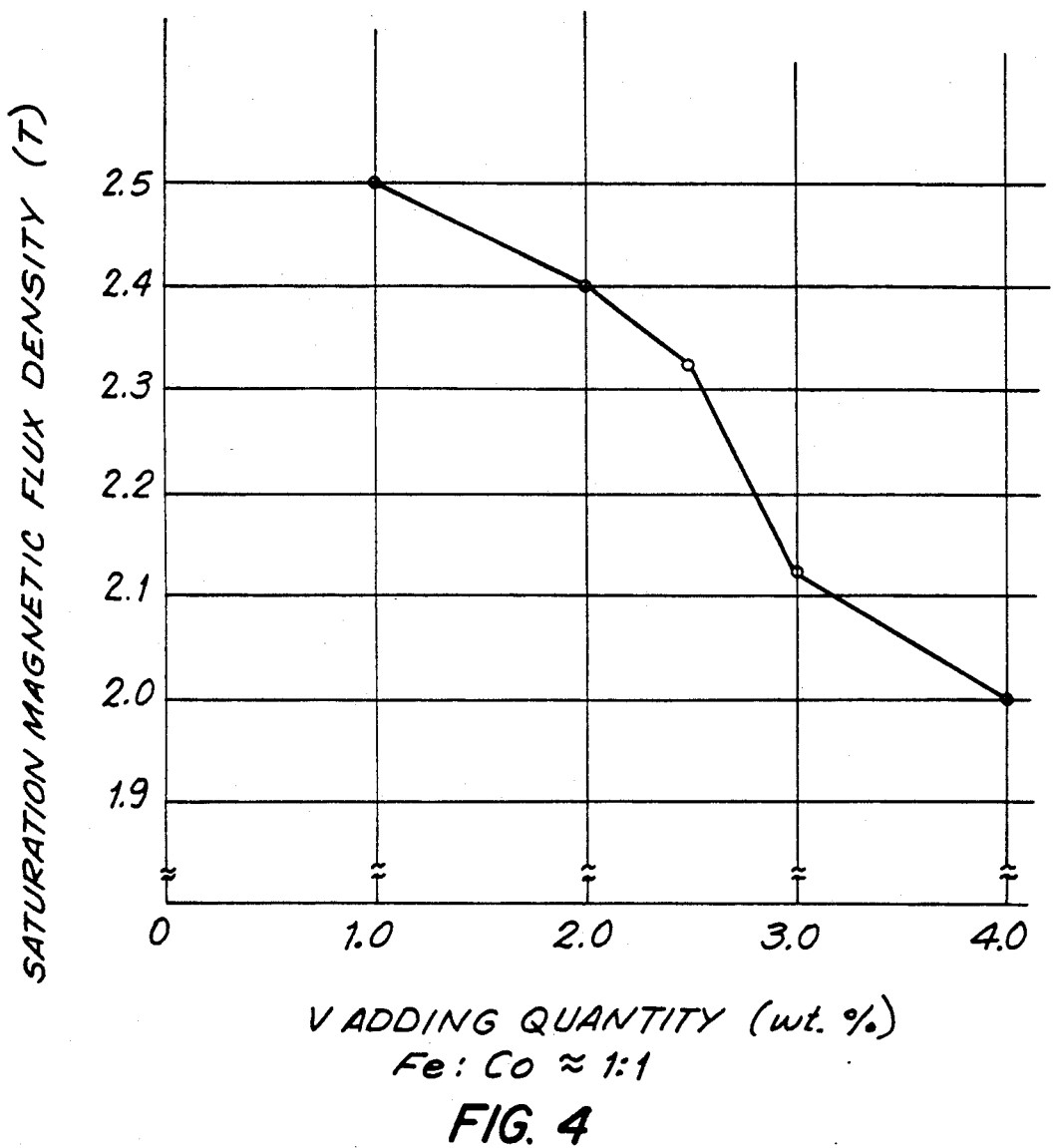
FIG. 4 is a graph illustrating the change in saturation magnetic flux density with a change in percentage of vanadium included in the magnetic material in accordance with the invention.

Fe-Co alloys in which the composition of Fe and Co is approximately equal is a soft magnetic material which exhibits a maximum saturation magnetic flux density as well as a large initial permeability. As shown in FIG. 3, increasing the amount of vanadium in the Fe-Co alloy increases the electrical resistance of the alloy. As shown in FIG. 4, increased amounts of vanadium also reduce the saturation magnetic flux density of the alloy.

The DC magnetic characteristics and electrical resistance of the magnetic circuit portions of print head 100 exert a significant influence on the performance of print head 100. As the magnetic circuit is employed in print head 100, large fluctuations in the direct electric current occur as coil 10 is energized then quickly de-energized. These large variations create many of the effects of AC. This leads to an efficiency loss due to the eddy current as if the magnetic circuit was operating under AC, which must be considered, because only the DC magnetic characteristics of the magnetic material are not determinants.

The degree of reduction of generation of eddy current undesirably hindering the generation of magnetic flux increases as the electric resistance of the magnetic circuit elements increase Consequently, as electrical resistance of the soft magnetic material of the magnetic circuit elements increases, loss due to eddy current also decreases Accordingly, the composition ratio of the soft magnetic material of the actuator is formulated to optimize the DC magnetic characteristics and the electric resistance.

The optimal percentage of vanadium to be included in the soft magnetic material of print head 100 to optimize the DC magnetic characteristics and the electric resistance, the energy efficiencies of core block 7, yoke 8, side yoke 9 and inner core 11 was determined experimentally. The energy efficiency corresponds to the efficiency at which electric energy input to coil 10 is converted to kinetic energy of print wire 1.

Figure 2:
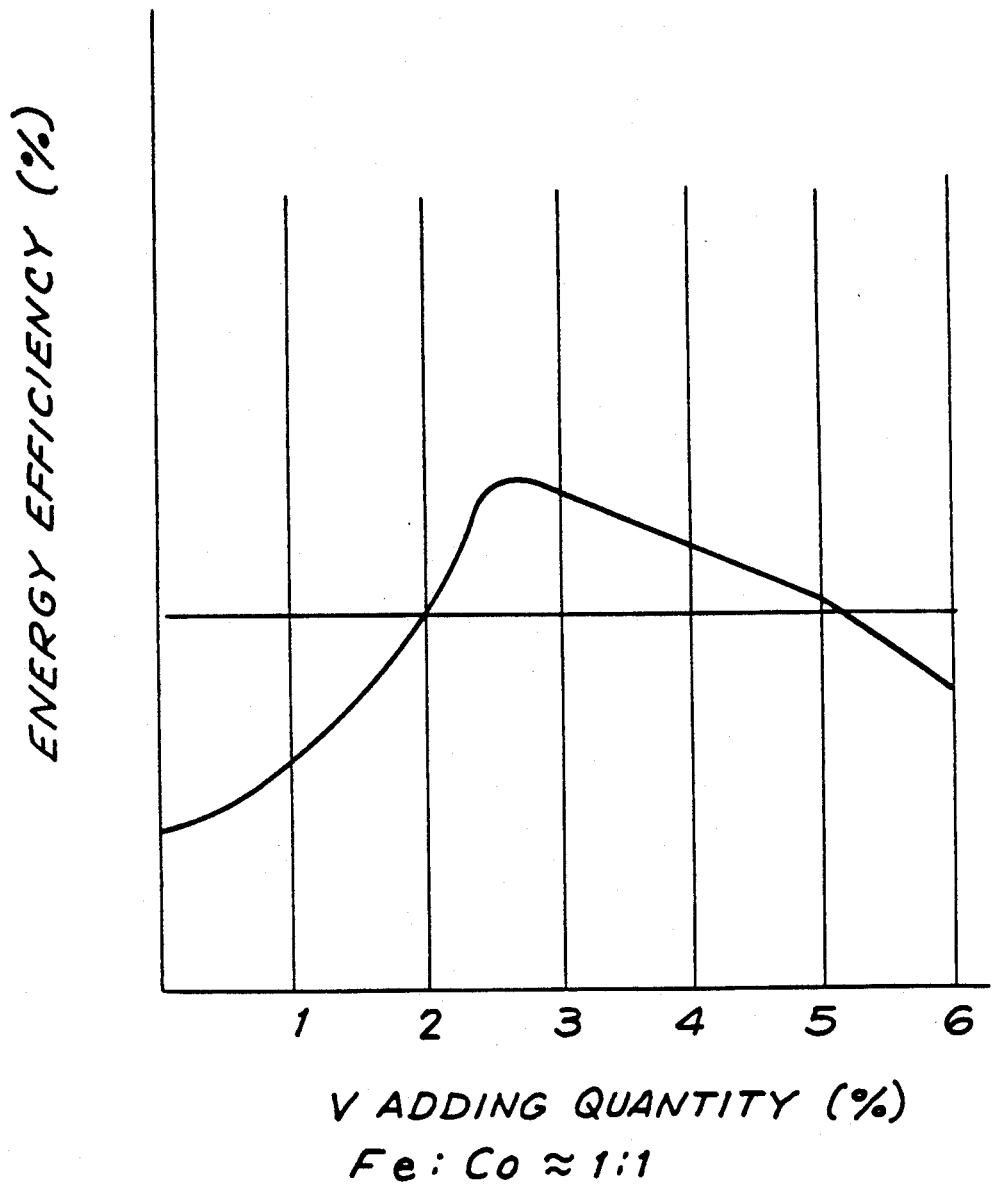
FIG. 2 is a graph illustrating the change in energy efficiency with a change of vanadium percentage included in the magnetic material in accordance with the invention.

As shown in FIG. 2, the energy efficiency for Fe-Co-V compositions including from 2% to slightly above 5% vanadium is higher than the energy efficiency for compositions including less than 2% vanadium. The highest energy efficiency occurred at a vanadium percentage of about 2.6%. When vanadium is present as 2.6% of the Fe-Co-V soft magnetic material alloy, the optimum balance occurs between DC magnetic characteristics and thus maximum energy efficiency is obtained.

Accordingly, by forming the soft magnetic material Fe-Co-V alloy to include between about 2.1 to 5% vanadium, an actuator having higher energy efficiency than an actuator including an Fe-Co-V alloy including less than 2% vanadium can be achieved. It is difficult to accurately set the quantity of vanadium at 2.6% with stability. A ±0.2% deflection commonly occurs and still provides acceptable qualities. Consequently, the optimum vanadium percentage is preferably in the range of about 2.4–2.8% to provide an actuator having low magnetic loss and high efficiency in an impact print head such as the direct attraction type impact print head shown in FIG. 1, spring charge type impact print heads and the like.

It will thus be seen that the objects set forth above among those made apparent from the preceding description, are efficiently attained and, since certain changes may be made in carrying out the above method and in the composition of matter and constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims ingredients or compounds recited in the singular are intended to include compatible mixtures of such ingredients wherever the sense permits.

What is claimed is:

1. A soft magnetic material having a composition consisting essentially of Fe, Co and V and formulated with substantially equal amounts of Fe and Co by weight with the balance from 2.4 to 2.8 weight percent vanadium.

2. The soft magnetic material of claim 1, wherein the vanadium is present as about 2.6 weight percent of the material.

3. An actuator including a coil disposed around ac ore for converting electrical current to magnetic force, the core comprising an alloy of soft magnetic material consisting essentially of fe, Co and V and formulated with substantially equal amounts of iron and cobalt and between about 2.4 to 2.8% by weight vanadium.

4. the actuator of claim 3, wherein the Fe-Co-V alloy consists of Fe, Co and V.

5. The actuator of claim 3, wherein the percentage of vanadium in the Fe-Co-V alloy is about 2.6% by weight.

6. A method of forming soft magnetic material, consisting essentially of Fe, Co and V, comprising combining substantially equal amounts of iron and cobalt with from 2.4 to 2.8 wt % vanadium to form an Fe-Co-V alloy.

7. The method of claim 6, wherein about 2.6 wt % vanadium is included in the Fe-Co-V alloy.

8. The soft magnetic material of claim 1, wherein the Fe-Co-V alloy consists of Fe, Co and V.

9. The soft magnetic material of claim 8, wherein the Fe-Co-V alloy includes about 2.6% by weight V.

10. The actuator of claim 4, wherein the Fe-Co-V alloy contains 2.6% vanadium.

11. The method of claim 6, wherein the Fe-Co-V alloy consists of Fe, Co and V.

12. The method of claim 11, wherein the Fe-Co-V alloy contains about 2.6% V.

* * * * *